United States Patent [19]

Wainwright

[11] Patent Number: 4,869,541
[45] Date of Patent: Sep. 26, 1989

[54] FORWARDLY PIVOTAL SEAT ASSEMBLY

[75] Inventor: John C. Wainwright, Riverview, Mich.

[73] Assignee: Lear Siegler Seating Corporation, Southfield, Mich.

[21] Appl. No.: 290,434

[22] Filed: Dec. 27, 1988

[51] Int. Cl.⁴ .............................................. B60N 1/10
[52] U.S. Cl. .................................. 296/65.1; 296/68.1; 297/379
[58] Field of Search ................. 296/65.1, 66, 69, 68.1; 297/331, 335, 14, 15, 379

[56] References Cited

U.S. PATENT DOCUMENTS

| | | | |
|---|---|---|---|
| 4,445,722 | 5/1984 | Schaper | 296/68.1 |
| 4,606,577 | 8/1986 | Hirama et al. | 293/331 |
| 4,699,418 | 10/1987 | Plavetich | 296/69 X |

FOREIGN PATENT DOCUMENTS

| | | | |
|---|---|---|---|
| 2449552 | 10/1980 | France | 297/331 |
| 4249 | 1/1980 | Japan | 297/331 |
| 830308 | 9/1983 | PCT Int'l Appl. | 297/335 |
| 2065761 | 7/1981 | United Kingdom | 297/331 |

Primary Examiner—Dennis H. Pedder
Assistant Examiner—Gary C. Hoge
Attorney, Agent, or Firm—Reising, Ethington, Barnard, Perry & Milton

[57] ABSTRACT

A vehicle seat assembly (10) of the type for moving between an upright seating position and a forwardly folded position. The assembly (10) includes a seat (20). A rear seat frame (30) pivotally supports a pair of jaws (39). The jaws (39) engage a pin (40) for locking the assembly (10) in the upright seating position. A cam (46) engages the jaws (39) and spreads the same to remove the jaws (39) from engagement with the pin (40) to allow the assembly (10) to move to the forwardly folded position. The assembly (10) is pivotable about a front frame (50). In the forwardly folded position, the lower seating member (22) defines a load carrying surface. A guide rod (72) interconnects the front frame (50) and the housing (51) having jaws (39) therein. The guide rod (72) retracts the housing (51) and jaws (39) when in the forwardly folded position interiorly of the lower seating member (22) and positions the jaws over the pin (40) when moving the seat to the upright position.

16 Claims, 6 Drawing Sheets

FORWARDLY PIVOTAL SEAT ASSEMBLY

TECHNICAL FIELD

This invention relates to vehicle seats. More particularly, this invention relates to vehicle seats which are used to carry passengers in an upright seating position and other loads in a forwardly folded load carrying position.

BACKGROUND ART

Some automotive vehicles are designed to fold the rear seat in such a manner that an area over the folded seats is provided for carrying cargo. It is particularly desirable to include a rear most seat which rests on a raised load carrying platform when in the upright seating position and folds forwardly of the load carrying platform when in the forwardly folded position. The seat should fold in such a manner as to become an extension of the load carrying platform when in the forwardly folded position.

One such an assembly is described in the U.S. Pat. No. 4,227,736 issued Oct. 14, 1980 to Lebault et al. This patent discloses a seat pivotal about a front frame member to a forwardly folded position. When in the upright seating position, the rear of the seat is locked to the vehicle floor by a locking member. When folded to a forwardly folded position, a portion of the locking member projects upwardly from the vehicle floor. Further, a portion of the locking member extends outwardly from the bottom of the seat. This creates a dangerous situation in that projections extend outwardly from both the load carrying platform and from the rear of the vehicle seat.

The U.S. Pat. No. 1,648,608 to Matthews issued Nov. 15, 1927 discloses a vehicle seat assembly which is pivotable about a front frame member to a forwardly folded position. When in the forwardly folded position, the bottom of the seat becomes a part of the floor. The system is deficient in that there is no means by which the seat can be locked in the upright seating position.

There remains a need for an efficient assembly for use in very compact vehicles.

SUMMARY OF THE INVENTION AND ADVANTAGES

According to the present invention there is provided a vehicle seat assembly adapted for mounting to a vehicle floor of the type for moving between an upright seating position and a forwardly folded position. The assembly comprises a seat including a lower seating member and an upper back rest member extending from the lower seating member. The assembly further includes front seat frame means adapted for fixed connection to the vehicle floor and pivotally connected to the lower seating member. The front seat frame means allows the seat to pivot between the upright seating position and the forwardly folded position. The assembly further includes rear seat frame member fixedly attached to the lower seating member. The assembly further includes locking means pivotally mounted to the rear seat frame member. The locking means extends below the lower seating member when the assembly is in the upright seating position for locking the assembly in the upright seating position. The assembly is characterized by including guide means for retracting the locking means interiorly of the lower seating member when the assembly is in the forwardly folded position.

Accordingly, there is provided a seat assembly which allows a vehicle seat to pivot forwardly of a load carrying platform to an intermediate position and to a fully forwardly folded position. In the forwardly folded position, the seat comprises an extension of the load carrying platform. Further, there is provided a means by which a locking member is retracted interiorly of the seat so as to not extend outwardly from the seat or from the load carrying platform when the assembly is in the forwardly folded position.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

A vehicle seat assembly adapted for mounting to a vehicle floor of the type for moving between an upright seating position and a forwardly folded position is generally shown at 10 in the Figures. The seating assembly 10 may be used in a variety of different environments. The assembly 10, however, is particularly well adapted for being the third seat in a mini-van which has three seats. The first seat 11 and second seat 13 are best viewed in FIGS. 1 and 2. The assembly 10 is adapted to be mounted on the vehicle floor which is generally indicated at 12. The floor 12 includes a raised load carrying platform 14. The floor 12 further includes a lower portion 16 forwardly of the load carrying platform; the lower portion 16 and load carrying platform 14 are interconnected by a substantially vertical wall 18.

The assembly 10 includes a seat generally indicated at 20. The seat 20 includes a lower seating member 22. The lower seating member or cushion 22 includes a seating surface 24. The seating surface 24 faces upwardly and away from the vehicle floor when the assembly is in the upright seating position. The seating surface 24 is for carrying passengers in the vehicle.

Figure 3:
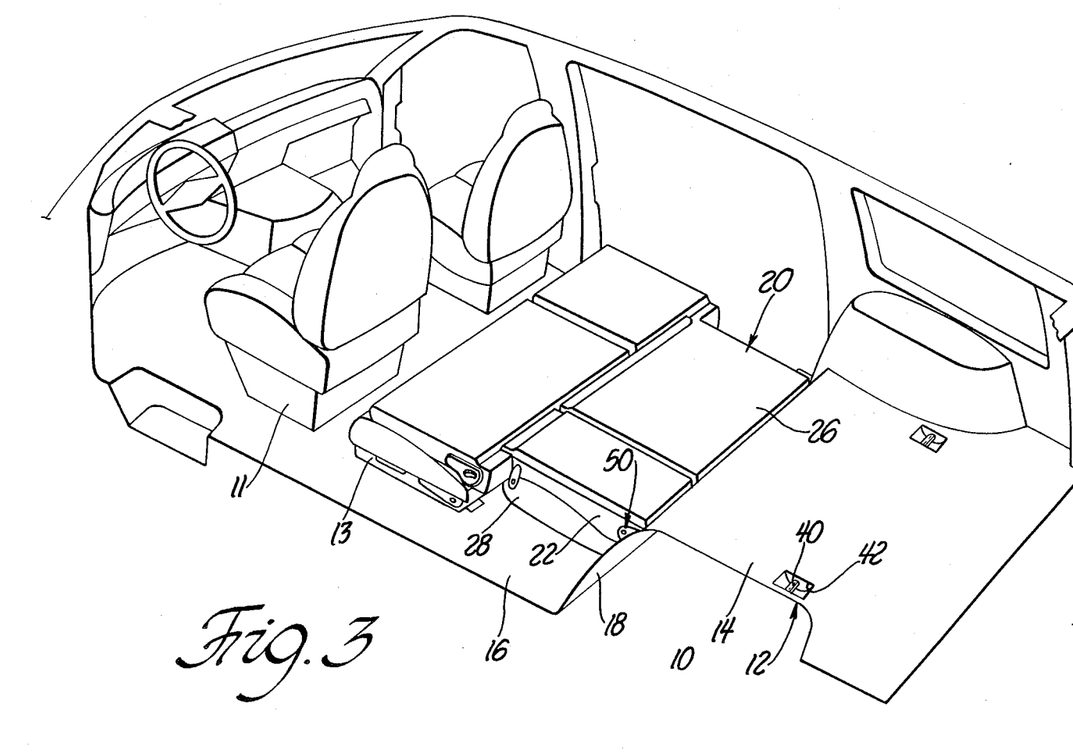
FIG. 3 is a perspective view of the interior of a vehicle showing the subject seat assembly in the forwardly folded position.

The lower seating member 22 further includes a load supporting surface 26 on the underside of the seating surface 24. The load supporting surface 24 faces downwardly (i.e., toward the floor 12) when the assembly 10 is in the upright seating position. Specifically, the seat assembly 20 normally is disposed over the load carrying platform 14 of the floor 12 when in the upright seating position. The load supporting surface 26 faces upwardly and away and from the floor 12 when the assembly 10 is in the forwardly folded position (as best viewed in FIG.

3). That is, when the assembly 10 is in the fully forwardly folded position, the load supporting surface forms an extension of the load carrying platform 14 by providing a surface even with the load carrying platform 14 of the vehicle floor 12 for carrying loads other than passengers.

Figure 5:
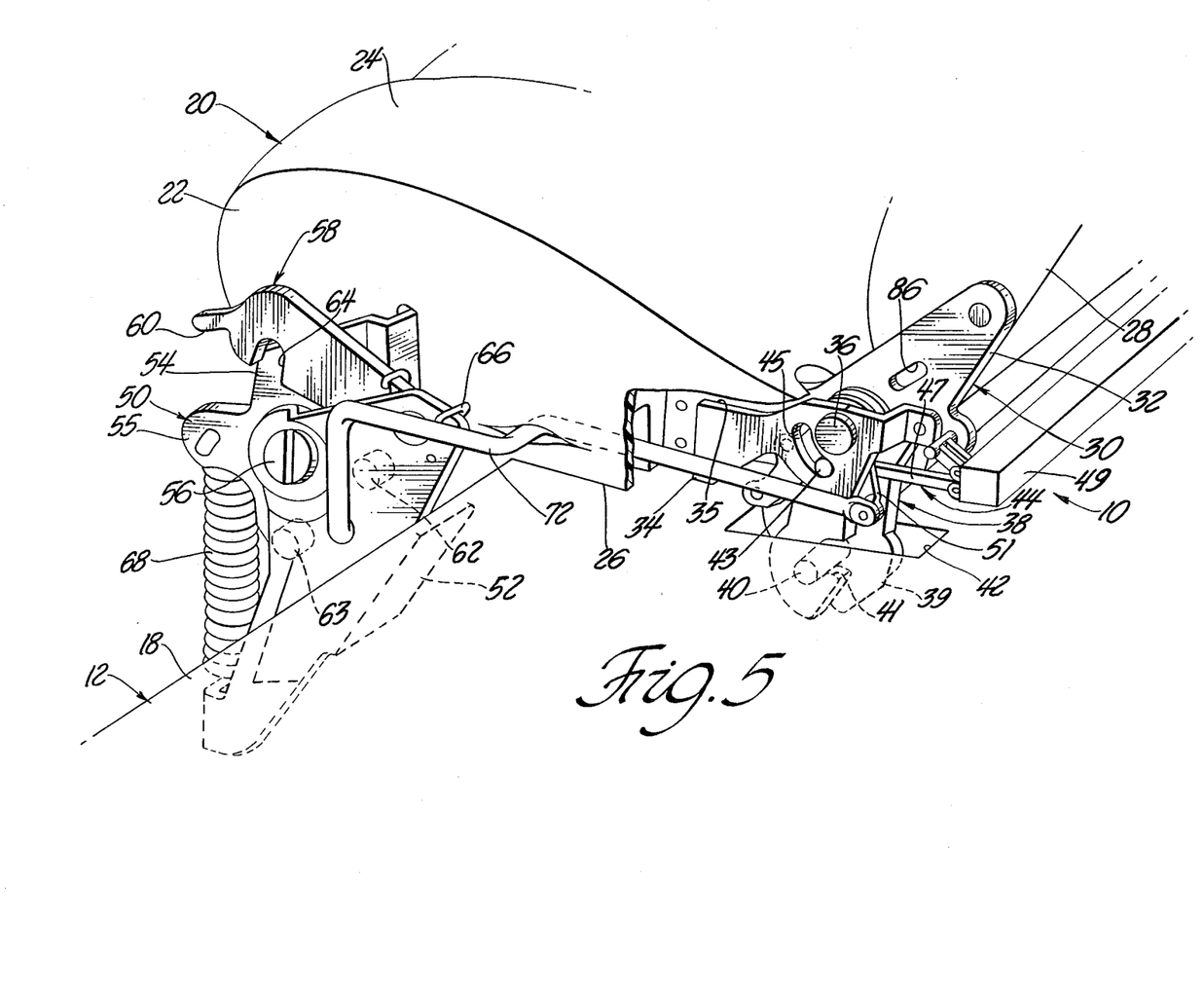
FIG. 5 is a perspective view of a seat assembly made in accordance with the instant invention.

The seat 20 further includes an upper back rest member 28. The upper back rest member 28 extends upwardly from the rear of the lower seating member 22. Specifically, the upper back rest member is pivotally connected to the lower seating member 22 by rear seat frame means generally indicated at 30 (as best viewed in FIG. 5). The rear seat frame means 30 is for providing the pivotable connection between upper back rest member 28 and the lower seating member 22. Further, the rear seat frame means is for pivotally supporting the locking means 38 as will be described subsequently. The rear seat frame means comprises an upper frame member 32 pivotally connected to the upper back rest member 28 of the seat 20. The rear seat frame means 30 further includes a lower frame member 34 fixedly connected to the lower seating member 22. The upper frame member 32 and lower frame member 34 are connected by a pin 36. The lower frame member 34 defines an opening 35.

The pin 36 further supports locking means generally indicated at 38. That is, the locking means 38 is pivotally mounted to the rear seat frame means 30 through the pin 36. The locking means 38 comprises a pair of jaws 39 pivotally mounted to the pin 36 of the rear seat frame means 30 for movement between open and closed positions in parallel vertical planes extending in the direction of folding movement of the seat assembly. The jaws 39 extend below the lower seating member 22 when the assembly 10 is in the upright seating position for being disposed about and engaging a locking pin 40 which is disposed in a recess 42 in the load carrying platform 14 of the floor 12. The jaws 39 are disposed in a rotatable housing 51. The jaws 39 have a recessed portion 41 for engaging the pin 40. The locking pin 40 is not raised from the load carrying platform 14. With the jaws 39 disposed about or engaging the locking pin 40, i.e., being in the closed position, the assembly 10 is locked in the upright seating position. In the preferred embodiment, there is a pair of locking means 38. One of the locking means is on each side of the lower seating member 22.

The locking means 38 further comprises opening means generally indicated at 44 for engaging each of the jaws 39 and pivoting and spreading them relative to one another from a closed position to an open position for releasing the jaws 39 from the locking pin 40. The opening means 44 comprises a cam 46 and a latch lever arm 47 extending from the cam 46. A torsion bar 49 connects each of the latch lever arms 47. A release handle 48 extends outwardly from the torsion bar 49 at a point midway between each of the latch lever arms 47. The cam 46 engages each of the jaws 39 and spreads or opens them relative to one another in response to a manual force applied to the handle 48. Specifically, as an upward force is applied to the handle 48 the cam 46 engages each of the jaws 39 and spreads them relative to one another enough for the jaws 39 to disengage the pin 40. By utilizing a torsion bar 49 interconnecting the pair of latch lever arms 47, the force applied to the handle 48 simultaneously opens or spreads both pairs of jaws 39 to disengage them from the respective pins 40.

As previously stated, the jaws 39 are mounted within a rotating housing 51. The housing 51 has a guide pin 43. The guide pin 43 is disposed in a guide slot 45. The guide slot 45 is formed in the lower frame member 34. The guide pin 43 and guide slot 45 are best viewed in FIG. 4.

The assembly 10 further includes front seat frame means generally indicated at 50 adapted for fixed connection to the near vertical wall 18 of the vehicle floor 12. The front seat frame means 50 is for pivotally connecting the lower seating member 22 with the vehicle floor 12 for allowing pivoting movement of the assembly 10 between the upright seating position and the forwardly folded position.

Specifically, the front seat frame means includes a base 52. The base 52 is adapted for fixed connection to the vertical wall 18 of the vehicle floor 12. The front seat frame means 50 further comprises a front frame member 54. The front frame member 54 is fixedly connected to the lower seating member 22 of the seat 20. The front frame member 54 is pivotally connected to the base 52 by a pivot pin 56. The front frame member 54 has a forward lobe 55 extending therefrom. The forward lobe 55 extends generally parallel to and spaced from the lower seating member 22.

The front seat frame means 50 further comprises retaining means generally indicated at 58. The retaining means 58 is for securing the assembly 10 in the forwardly folded position. Specifically, the retaining means 58 comprises a latch member 60 pivotally mounted to the base 52. The retaining means 58 further comprises a plurality of projections 62, 63 fixedly secured to the front frame member 54. The projections 62, 63 define the position of the seat 20 when forwardly folded. The latch member 60 includes a groove 64 for engaging the projections 62, 63 when the assembly is moved to the upright seating position. The latch member 60 is biased toward the pins by a spring 66. Thus, as the seat 20 is rotated forwardly from the upright seating position to the forwardly folded position the projection 62 engages the groove 64 when the assembly 10 is in the intermediate position. In the intermediate position (as viewed in FIG. 2) the seat 20 is completely off the load carrying platform 14. This allows the entire load carrying platform 14 to be used to carry loads. While in this intermediate position, the seat 20 does not support any loads. The seat 20 can be further rotated forwardly until the projection 63 engages the groove 64. In this position, the seat 20 is in the forwardly folded position (as best viewed in FIG. 3). In this fully forwardly folded position, the lower seating member 22 comprises an extension of the load carrying platform for carrying loads other than passengers.

Figure 2:
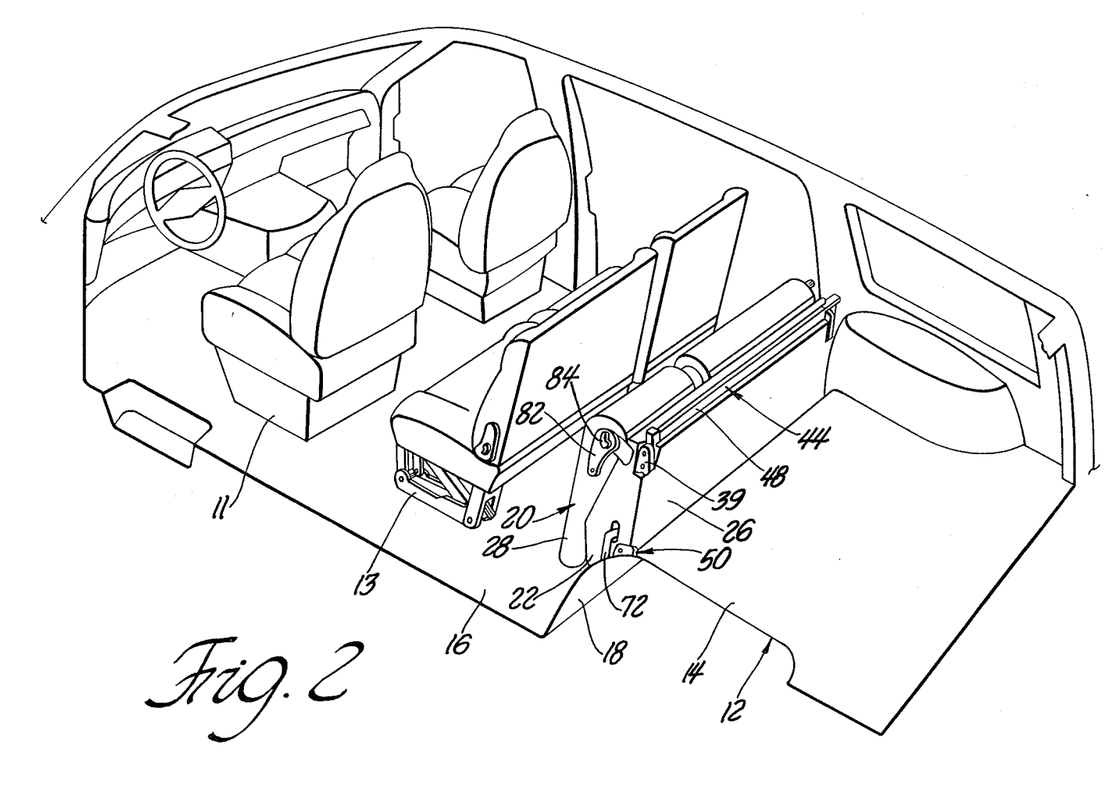
FIG. 2 is a perspective view of the interior of a vehicle showing the subject seat assembly in a forward position.

The assembly 10 further includes biasing means 68 for biasing the pivoting movement of the assembly 10 from the upright seating position toward the forwardly folded position. More particularly, the biasing means 68 comprises a counterbalance spring 68. The spring 68 extends between the forward lobe 55 and the base 52. The spring 68 initially aids pivoting movement of the seat 20. That is, as the seat 20 is folded to the forward position the spring 68 pulls on the forward lobe 55, aiding the pivoting movement of the seat 20. This is because the spring 68 creates a moment about the pivot pin 56 in the same direction as the pivoting movement of the seat 20. Once the seat 20 is in the intermediate or vertical position, as shown in FIG. 2, the spring 68 works against forward pivoting movement of the seat 20. This is because the spring 68 creates a moment about the pivot pin 56 opposite in direction to the pivoting movement of the seat 20. At this point, however, the moment created by the seat 20 about the pivot pin 56 easily overcomes the moment of the spring 68 in the opposite direction. Once the seat 20 is in the forwardly folded position, the spring 68 aids the pivoting movement of the seat 20 back to the upright seating position. This is because the spring 68 will again, pull on the forward lobe 55 creating a moment about the pivot pin 56 in the same direction of the pivoting movement of the seat 20. Until the seat 20 is vertical, in the intermediate position. Again at this point the spring 68 works against the pivoting movement of the seat 20. The moment created by the seat 20 again overcomes the moment of the spring 68 about the pivot pin 56.

Figure 4:
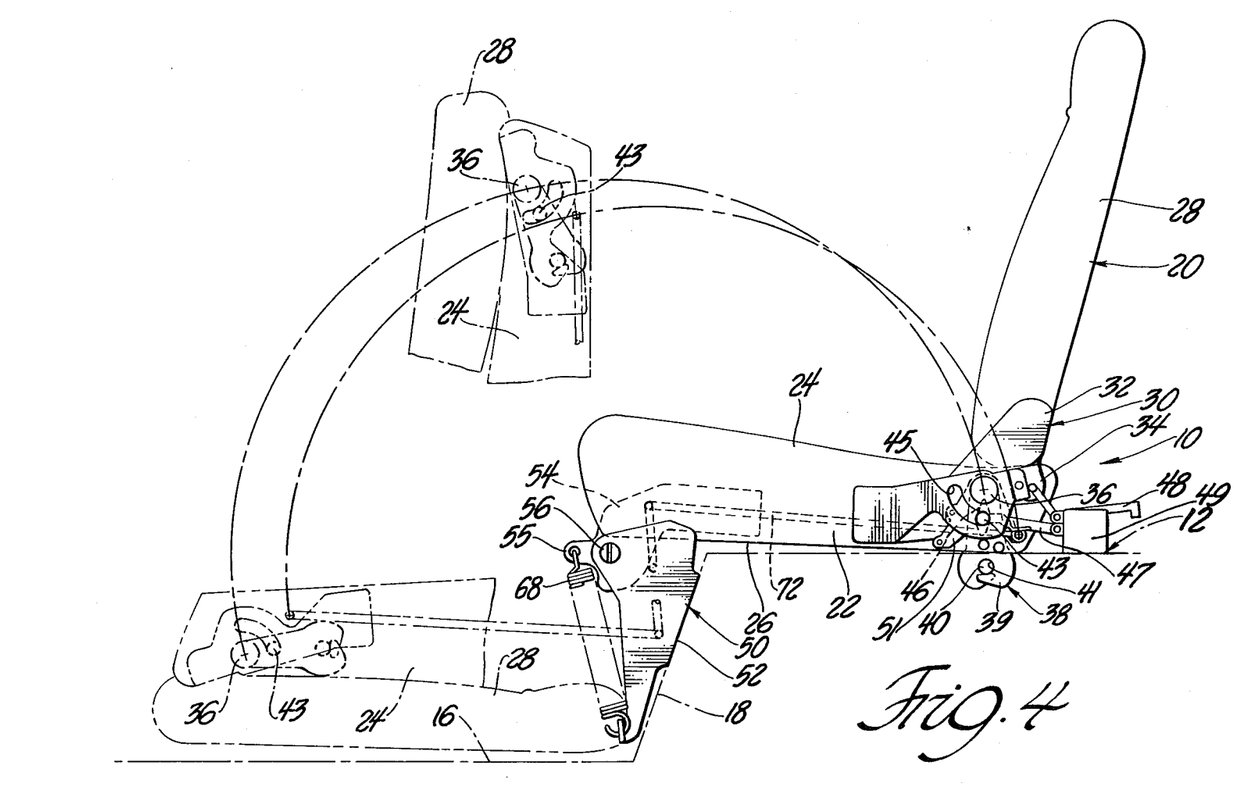
FIG. 4 is a side elevational view of a seat assembly made in accordance with the instant invention.

The assembly further includes guide means 72. The guide means 72 is for retracting the housing 51 and jaws 39 interiorly of the lower seating member 22 when the assembly 10 is in the forwardly folded position. Specifically, as the assembly 10 is moved to the forwardly folded position, the guide means 72 engages the housing 51 which in turn contacts the jaws 39 and retracts them into the opening 35 defined by the lower frame member 34 of the rear seat frame means 30. The guide means comprises a guide rod 72 interconnecting the front frame means 50 and the housing 51. The length of the guide rod 72 is generally L-shaped and interconnects the base 52 with the housing 51. The guide rod is pivotally connected to a member 73. The housing 51 engages each of the jaws 39. The guide rod 72 pulls the housing 51 and retracts the jaws 39 as previously stated when moving the seat 20 to the forwardly folded position (as best seen in FIG. 4). The guide pin 43 moves within the guide slot 45. The guide rod 72 further guides the housing 51 and thereby the jaws 39 onto the locking pin 40 as the seat 20 is moved from the forwardly folded position to the upright seating position. The guide rod 72 ensures that the jaws 39 will be positioned properly when moving the assembly 10 from the upright seating position to the forwardly folded position.

Figure 6:
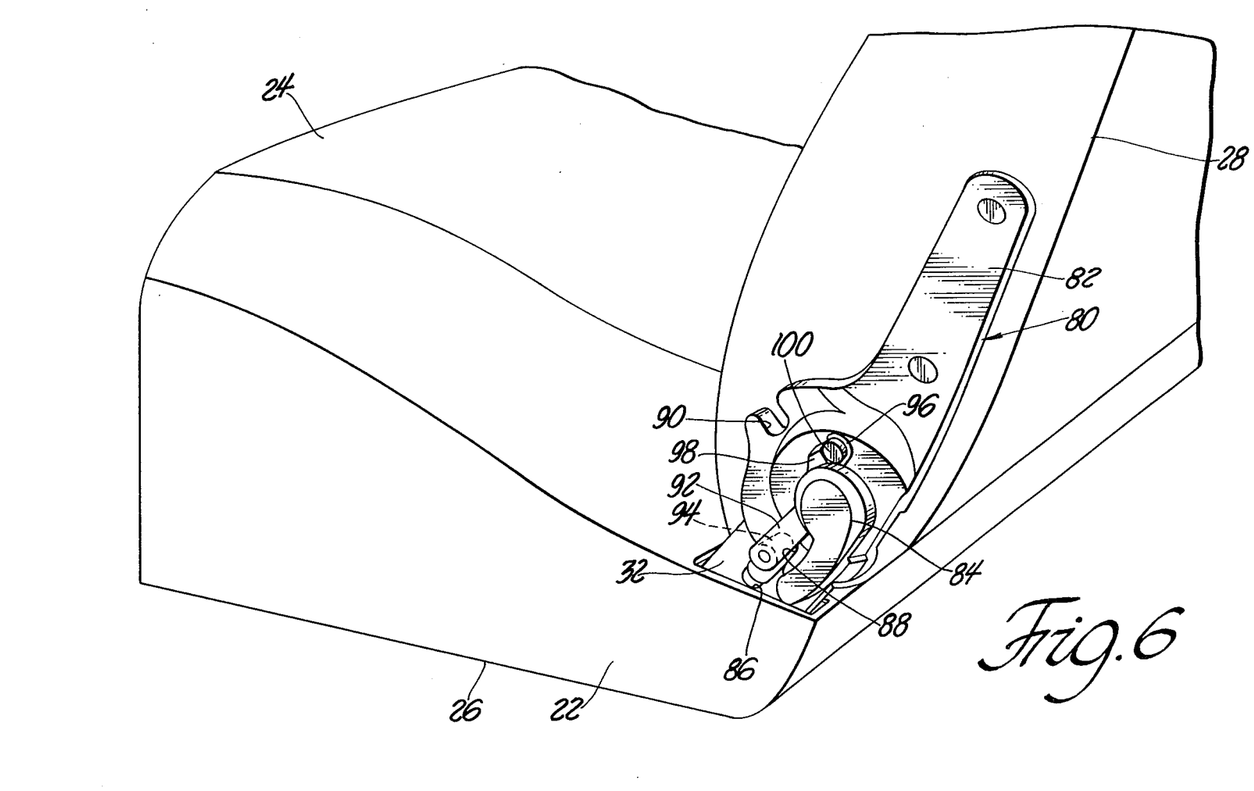
FIG. 6 is a perspective view of a latching assembly made in accordance with the instant invention.

The assembly 10 also includes latching means generally indicated at 80 (as best viewed in FIG. 6). The latching means 80 permits selective pivoting movement of the upper back rest member 28 between the upright seating position and the forwardly folded position. The latching means comprises a plate 82 having a plurality of notches 88, 90 fixedly secured to the upper back rest member 28. The plate 82 is pivotally secured to the upper frame member 32 by a pin (not shown). The upper frame member includes a slot 86 therein. A latch lever 84 is also pivotally supported by the pin. A latch arm 92 is pivotally connected to the latch lever 84 and has a finger 94 thereon. The finger 94 is slideably disposed in the slot 86. The latching means 80 further includes a spring 96 which biases the lever 84. The latch lever 84 further includes a radially extending stop member 98. The stop member 98 is for engaging a post 100 on the plate 82 and limiting pivotal movement of the latch lever 84. The finger 94 engages each of the slot and the notches 88, 90 for selectively locking the upper back seat member 28 in the upright seating position or the forwardly folded position. It is appreciated that the latching means 80 is given by way of example and any means of forwardly pivoting the upper back rest member 28 is within the scope of the present invention.

Figure 1:
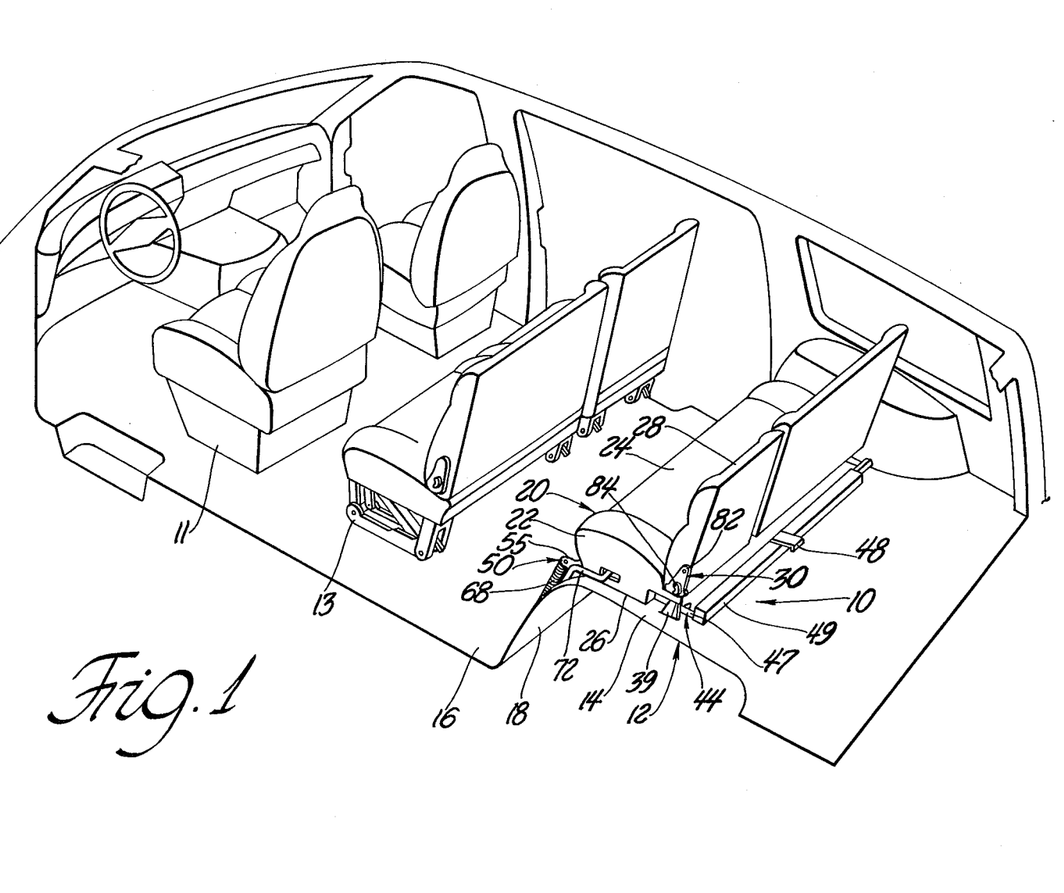
FIG. 1 is a perspective view of the interior of a vehicle utilizing the subject seat assembly.

In operation, the seat assembly 10 is normally in the upright seating position, as shown in FIG. 1. Referring to all the Figures, the lower seating member or cushion 22 is disposed above or over the lower carrying platform 14 of the floor 12 and the jaws 39 engage the pin 40. To move the assembly 10 to the forwardly folded position, the latch lever 84 is manually pivoted. This moves the finger 94 within the slot 86. The finger 94 moves out of the notch 88 permitting the upper back rest member 28 to pivot forwardly until the finger 94 engages the notch 90 under the biasing of the spring 96. Once the finger 94 engages the notch 90, the back rest member 28 is locked in the forward folded position horizontally overlying the seat cushion 20. The handle 48 is then rotated upwardly. This causes the cam 46 to engage the jaws 39 and pivot to spread them from the closed position to the open position to release the jaws 39 from the locking pin 40. A manual force is then applied to the assembly 10 to lift and rotate the seat 20 upwardly and forwardly through the position shown in phantom in FIGS. 2 and 4. The counter balance spring 68 aids in this movement of the seat assembly 10. When the lower seating member 22 and back rest member 28 are substantially perpendicular to the vehicle floor 12, as shown in FIG. 2 and in phantom in FIG. 4, the projection 62 engages the groove 64 of the latch member 60. This locks the seat in an upright intermediately forwardly folded position (as best viewed in FIG. 2). In this position, the seat 20 is raised completely off the load carrying platform 14 to allow larger loads to be carried on the platform 14. The jaws 39 are retracted into the opening 35 by the guide rod 72. To continue pivotal folding movement of the seat to the forwardly folded position, the latch member 60 is lifted until the biasing of the spring 66 is overcome and the latch 60 disengages the projection 62. The seat 20 is then pivoted forwardly until the load supporting surface 26 of the lower seating member 22 is facing upwardly and is disposed forwardly, below and away from the floor 12. In this position the latch member 60 engages the projection 63, locking the assembly 10 in the fully forwardly folded position. The guide bar 72 retracts then housing 51 and jaws 39 fully into the opening 35 defined by the lower frame member 34. The entire seat 25 is disposed in the forward lower portion 16 of the floor 12. Also, the load supporting surface 26 of the lower seating member 22 is substantially flush with and forms an extension of the load carrying platform 14, as best viewed in FIG. 3. The back rest member 28 is completely folded under the lower seating member 22.

To return the seat assembly 10 to the upright seating position, the latch member 60 is lifted until the projection 62 is released from the groove 64. A manual force is then applied to the seat 20 to begin rotating the seat 20 back to the upright seating position. The counter balance spring 68 aids the movement from the forwardly folded position to the upright seating position as previously described. The guide bar 72 positions the jaws 39 directly over the locking pin 40. The seat is then lowered until the jaws 39 engage the locking pin 40 thereby locking the lower seating member 22 in the upright seating position. The latch lever 84 is then manually pivoted to move the finger 94 out of the notch 90, allowing the back rest member 28 to be pivoted to the upright seating position. The upper back rest member 28 is pivoted until the finger 94 engages the notch 88, locking the back rest member 28 in the upright seating position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A vehicle seat assembly (10) adapted for mounting to a vehicle floor (12) of the type for moving between an upright seating position and a forwardly folded position and having an intermediate position, said assembly (10) comprising:

a seat (20) including a lower seating member (22) and an upper back rest member (28) extending from said lower seating member (22);

front seat frame means (50) adapted for fixed connection to the vehicle floor (12) and pivotally connected (56) to said lower seating member (22) for allowing said seat (20) to pivot between the upright seating position and the forwardly folded position, rear seat frame means (30) fixedly attached to said lower seating member (22);

locking means (38) pivotally mounted to said rear seat frame means (30) and extending below said lower seating member (22) when said assembly (10) is in the upright seating position for locking said assembly (10) in the upright seating position;

said assembly (10) characterized by guide means (72) for retracting said locking means (38) interiorly of said lower seating member (22) when said assembly (10) is in the forwardly folded position.

2. An assembly as set forth in claim 1 further characterized by said guide means (72) comprising a guide rod (72) pivotally interconnecting said front seat frame means (50) and said locking means (38) for retracting said locking means (38) interiorly of said lower seating member (22) while said assembly (10) is moved to the forwardly folded position and for guiding said locking means (30) to extend from said lower seating member (22) while said assembly (10) is moved to the upright seating position.

3. An assembly as set forth in claim 2 further characterized by said locking means (38) comprising a pair of jaws (39) pivotally attached to said rear frame means (30) for movement between open and closed positions.

4. An assembly as set forth in claim 3 further characterized by including a pin (40) adapted for fixed connection to a recess (42) in the vehicle floor (12), said jaws (39) being disposed about said pin (40) when said assembly is in the upright seating position and said jaws are in the closed position.

5. An assembly as set forth in claim 4 further characterized by said locking means (38) further comprising opening means (44) for engaging each of said jaws (39) and pivoting same relative to one another from said closed position to said open position for releasing said jaws (39) from said pin (40).

6. An assembly as set forth in claim 5 further characterized by said opening means (44) comprising a cam (46) and a handle (48) extending therefrom, said cam (46) engaging each of said jaws (39) and opening them relative to one another in response to a manual force applied to said handle (48).

7. An assembly as set forth in claim 6 further characterized by said front seat frame means (30) comprising a base (52) adapted for fixed connection to the vehicle floor (12) and a front frame member (54) fixedly connected to said lower seating member (22), said front frame member (54) pivotally connected to said base (52) for allowing said assembly (10) to pivot between the upright seating position and the forwardly folded position.

8. An assembly as set forth in claim 7 further characterized by said front seat frame means (50) further comprising retaining means (58) for securing said assembly (10) in the forwardly folded position.

9. An assembly as set forth in claim 8 further characterized by said retaining means (58) comprising a latch member (60) pivotally mounted to said base (52), and a plurality of projections (62, 63) on said front frame member (54), said latch (60) engaging said projections (62, 63) when said assembly (10) is in the forwardly folded position.

10. An assembly as set forth in claim 9 further characterized by including biasing means (68) for biasing the pivoting movement of said assembly (10) from the upright position toward the forwardly folded position.

11. An assembly as set forth in claim 10 further characterized by said front frame member (54) having a forward lobe (55) extending generally parallel to and spaced from said lower seating member (22), said biasing means (68) connecting said forward lobe (55) with said base (52).

12. An assembly as set forth in claim 11 further characterized by said biasing means (68) comprising a spring (68).

13. An assembly as set forth in claim 12 further characterized by each of said jaws (39) having a recessed portion for receiving said pin (40) when said assembly (10) is in the upright position.

14. An assembly as set forth in claim 13 further characterized by said lower seating member (22) having a seating surface (24) and a load supporting surface (26), said seating surface (24) facing upwardly and away from the vehicle floor (12) when said assembly (10) is in the upright seating position, and said load supporting surface (26) facing upwardly and away from the vehicle floor (12) when said assembly (10) is in the forwardly folded position.

15. An assembly as set forth in claim 14 further characterized by said locking means (38) including a rotatable housing (51) for enclosing said jaws (39), said guide rod (72) connected to said housing (51).

16. An assembly as set forth in claim 15 further characterized by including latching means (80) for permitting selective pivoting movement of said upper back rest member (28) between the upright seating position and the forwardly folded position.

* * * * *